United States Patent [19]
Buehler et al.

[11] 3,967,278
[45] June 29, 1976

[54] LOW COST MICROWAVE RECEIVER FOR ILS

[75] Inventors: Walter E. Buehler, Issaquah; George W. Fitzsimmons, Lynwood, both of Wash.

[73] Assignee: The Boeing Company, Seattle, Wash.

[22] Filed: Oct. 23, 1974

[21] Appl. No.: 517,193

[52] U.S. Cl. ............................ 343/108 R; 343/109; 333/73 S
[51] Int. Cl.² ........................ G01S 1/16; G01S 1/18
[58] Field of Search ................ 343/108 R, 109, 107; 333/6, 9, 73 S

[56] References Cited
UNITED STATES PATENTS

| | | | |
|---|---|---|---|
| 3,505,676 | 4/1970 | Perkins | 343/109 |
| 3,611,197 | 10/1971 | Moore et al. | 333/73 S |
| 3,713,160 | 1/1973 | Becavin | 343/108 R |
| 3,715,757 | 2/1973 | Toman | 343/108 R |
| 3,787,841 | 1/1974 | Buehler et al. | 343/108 R |
| 3,796,970 | 3/1974 | Snell, Jr. | 333/6 |
| 3,824,594 | 7/1974 | Hundley | 343/108 R |

Primary Examiner—Malcolm F. Hubler
Assistant Examiner—T. M. Blum
Attorney, Agent, or Firm—Christensen, O'Connor, Garrison & Havelka

[57] ABSTRACT

In an instrument landing system (ILS), an aircraft is provided with apparatus for receiving from a ground-based transmitter overlapped modulated beam signals, which, when processed by the receiver, provide information about the position of the aircraft relative to a desired navigation course. Provided in the aircraft receiver apparatus is an antenna for receiving the transmitted beam signal, and an RF amplifer for amplifying the received signals. The received signal energy is divided between two recovery lines, each recovery line being routed near a separate series of ring filters, with the ring filters adjacent one recovery line substantially eliminating the signal energy in that line associated with one of the beams, and the ring filters adjacent the other recovery line substantially eliminating the signal energy in that line associated with the other beam. The remaining signals in each recovery line are then detected and applied through follow-on amplifying and filtering circuits to visual indicators for display of ILS information.

9 Claims, 4 Drawing Figures 3,967,278

LOW COST MICROWAVE RECEIVER FOR ILS

BACKGROUND OF THE INVENTION

The present invention relates generally to the microwave receiver art, and more specifically concerns microwave receivers useful in instrument landing or other navigation systems.

Instrument landing systems (ILS) for aircraft which use carrier frequencies in the microwave frequency range (i.e., above 3 GHz) are often desirable as opposed to conventional VHF/UHF ILS systems because significantly smaller antenna apertures may be used at the transmitter location. In conventional VHF/UHF ILS, transmitting antennas of reasonable size tend to project beams which are poorly defined and difficult to control, a significant disadvantage in those applications where beams must be tailored to prevent interference from particular structural or topographical monuments adjacent the landing path of the aircraft. The use of microwave frequencies, on the other hand, permits a significant amount of beam control using a reasonably sized antenna aperture. These principles of microwave ILS, with attendant beam shaping, are more fully explained in U.S. Pat. No. 3,798,646, to Buehler, et al. and assigned to the same assignee as the present invention.

The use of microwave carrier frequencies, however, demands that the onboard aircraft receiver be suitable for processing microwave frequencies. Heretofore, this has been accomplished in either one of two ways. In the first approach, a conventional (i.e., UHF/VHF) receiver is converted to handle the microwave frequencies, or, in the second approach, a microwave receiver is specially designed to process the microwave frequencies of the particular ILS system being used. In the first approach, a significant and expensive problem develops because of the extremely high stability of the local oscillator necessary to properly downconvert the microwave carrier frequencies to the frequencies normally processed in the UHF/VHF receiver. Thus, the converted microwave receiver includes an add-on device at its front end which downconverts the received microwave frequencies to the frequencies for which the VHF/UHF receiver is designed.

In a typical UHF/UHF receiver, the carrier frequency for the localizer beam will be 110 MHz, and the carrier frequency for the glide slope will be 330 MHz. Because of rather severe channel bandwidth restrictions in those frequency ranges, and in order to maintain the noise level at a tolerable magnitude, data bandwidths of 40 KHz and 120 KHz are typically provided with respect to the 110 MHz and 330 MHz carrier frequencies, respectively. Since the carrier frequencies in the microwave ILS system are typically above 3 GHz, and in the ILS system used with the receiver of the preferred embodiment are 5.10 and 5.23 GHz, (i.e., C-band microwave frequency) the frequency of the local oscillator which in combination with a mixer downconverts the carrier frequencies to the VHF/UHF carrier frequencies must have a stability which is directly proportional to the data bandwidths of the two carrier frequencies. That is, the narrower the data bandwidth, the greater must be the stability of the local oscillator, so that the down converted signal does not drift out of the bandwidth. To adequately maintain the data bandwidth at 40 KHz the stability of the local oscillator must be on the level of 1 part in $10^7$, which is a very high stability requirement and requires an oscillator which is temperature controlled and rather expensive.

The other approach, as noted above, uses a microwave receiver specially designed for processing microwave carrier frequencies. In the microwave frequency range, the channel separation is typically on the order of hundredths of MHz, and therefore, does not require an oscillator with the stability required by receiver using the converted VHF/UHF approach. Such a microwave receiver, however, has heretofore included a local oscillator with a mixer followed by IF amplifier which in turn is connected to conventional detection and amplifying circuits of the ILS indicating equipment in the aircraft. Such an approach, although workable, increases the cost of the on-board system significantly and thus denies the use of ILS capability to many aircraft.

Accordingly, it is a general object of the present invention to overcome those disadvantages of prior art ILS receivers discussed above.

It is another object of the present invention to provide an ILS microwave receiver which is compatible with existing ILS indicating equipment in aircraft.

It is a further object of the present invention to provide such a microwave receiver which does not require the use of a local oscillator or a mixer.

It is another object of the present invention to provide an ILS microwave receiver which is relatively inexpensive to manufacture.

SUMMARY OF THE INVENTION

Accordingly, the present invention includes a signal processing apparatus which is useful in a microwave frequency instrument landing system (ILS) for aircraft or similar maneuverable apparatus. The ILS system includes an antenna for projecting two orthogonal pairs of modulated, overlapping beams comprising modulated carrier signals into space, wherein equal modulation signal levels in the respective pairs of overlapping beams define a directional axis which is the desired navigational path of the aircraft. The carrier signal of one pair of projected beams has a first carrier frequency and is so oriented in space as to provide glide slope information for the aircraft relative to the desired navigation path, while the carrier signal of the other pair of projected beams has a second carrier frequency and is so oriented in space as to provide localizer information for the aircraft relative to the desired navigation path. Each carrier signal is modulated by first and second modulating signals, thereby forming the respective pairs of beams.

The signal processing apparatus itself includes antenna means which is mounted on the aircraft for receiving the two orthogonal pairs of beams projected by the antenna and which provides at its output a composite signal which comprises the combined modulated carrier signals from the received beams. The composite signal is then split between two signal lines. Means are provided associated with one of the signal lines for eliminating therefrom a substantial portion of the first carrier signal, with the remaining modulated second carrier signal defining first channel signals. Means are also provided associated with the other signal line for removing therefrom a substantial portion of the second carrier signal with the remaining first carrier signal defining second channel signals. A detector is provided for detecting the first and second channel signals, and means are then provided for discriminating between the respective modulating signal frequencies of both the first channel signals and the second channel signals. The detected modulating signals of the first channel signals are applied to a glide slope indicator and the discriminated modulating signal of the second channel signals are applied to a localizer indicator. The difference in magnitude between the respective discriminated modulating signals of the first and second channel signals control the relative positions of the respective glide slope and localizer indicators.

More specifically, the splitting and removing means described above is a strip line circuit arrangement which branches from one into two spaced individual strip lines, and which includes two sets of ring filters arranged adjacent to the individual spaced strip lines, one set of ring filters being tuned to the first carrier frequency, and the other set of ring filters being tuned to the second carrier frequency.

DESCRIPTION OF THE DRAWINGS

A more thorough understanding of the invention may be obtained by studying the following detailed description taken in connection with the accompanying drawings.

DESCRIPTION OF THE PREFERRED EMBODIMENT

Figure 1:
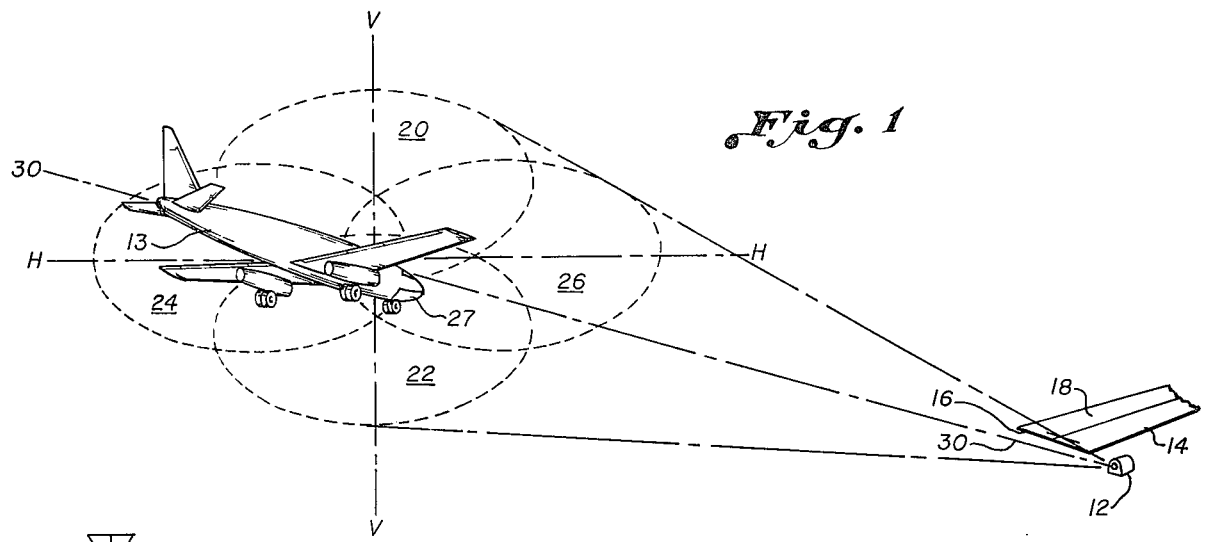
FIG. 1 is a pictorial representation of an ILS system showing an aircraft approaching a landing field within the coverage of the projected ILS beams.

Referring to FIG. 1, an aircraft 13 is shown approaching a landing field shown generally at 18, along a desired landing course 30—30 defined by projected beams 20, 22 24 and 26. Briefly, such an ILS system includes a transmitter, shown pictorially at 12, which generates two orthogonal pairs of beams and projects them such that they intersect and diverge from each other and have partial equal power points along a directional axis 30—30 along which the aircraft 13 attempts to fly toward the runway 18. For purposes of simplicity, both orthogonal pairs of beams are shown generated by transmitter 12, referred to as a colocated system, which is positioned adjacent longitudinal edge 14 of the runway 18 at its approach end 16 thereof. A similar system with colocated beam generation capability is described in U.S. Pat. No. 3,798,646 to Buehler et al. and assigned to the same assignee as the present invention. It is not necessary, however, for purposes of the present invention, that the two beam pairs be projected by transmitters which are colocated.

Beams 20 and 22, which are projected along a first plane which includes vertical axis V—V, provide the glide slope information, and beams 24 and 26, which are projected along a second plane which is perpendicular to the first plane and includes horizontal axis H—H provide the localizer information. Preferably, each pair of beams has a different carrier frequency, such as the 5.01 GHz carrier frequency for the glide slope, and the 5.23 GHz carrier frequency for the localizer beams used in the ILS system of which the receiver of the preferred embodiment forms a part. Each carrier signal is modulated by audio frequencies of 90 Hz and 150 Hz respectively, such that the beams having common carrier frequencies may be easily distinguished from one another by the receiver. For instance, beams 20 and 24 may be modulated by the 90 Hz signal, and beams 22 and 26 by the 150 Hz signal.

The aircraft 13 has an onboard receiver and indicator system 27, which receives each of the four projected beams 20, 22, 24, and 26 and translates the information received into an indication of aircraft offset from the desired landing path defined by directional axis 30—30. This is accomplished by comparing the relative strengths of the modulating signals for each carrier frequency. When the modulation signal strengths are substantially equal, the aircraft is known to be correctly positioned relative to the glide slope or localizer direction defined by that carrier frequency. When both the glide slope (up-down) and localizer (azimuth) modulating signals are equal, it is known that the aircraft is on the desired landing path 30—30. A difference in modulation signal strengths between the two localizer beams 24,26 or the two glide slope beams 20,22 indicates that the aircraft position needs correction.

Figure 2:
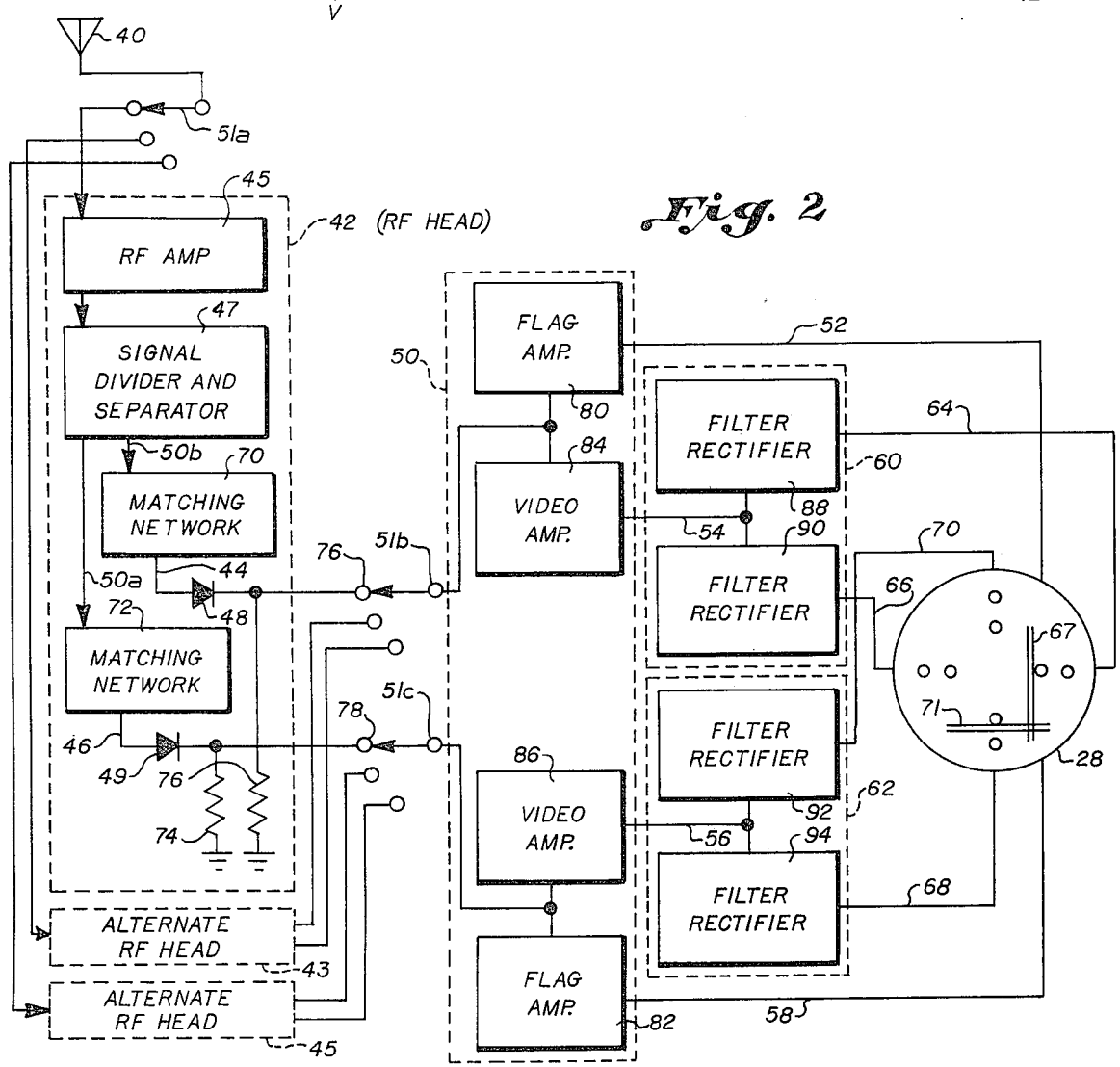
FIG. 2 is a block diagram of the preferred embodiment of the present invention.

Referring now to FIG. 2, the microwave receiver of the present invention is shown. The receiver is positioned in the aircraft, and is operative to translate the received localizer and glide slope beam signals into corresponding indications on the visual indicator 28 typically provided in the cockpit of the aircraft for inspection by the pilot.

Briefly, for purposes of overview, the projected glide slope and localizer beams, such as shown in FIG. 1, are received by an onboard antenna 40 which in turn is connected to an RF head circuit 42 through switch 51a. Within RF head 42, the signals from antenna 40 are processed by RF amplifier 45, signal divider and separator 47 and impedance matching networks 70 and 72, such that the signals on lines 44 and 46 from matching networks 70 and 72 contain substantially only localizer and glide slope information, respectively.

The signals on lines 44 and 46 are then applied, respectively, to detectors 48 and 49 which function to demodulate the signals present on lines 44 and 46. The detected signals are then applied through switches 51b and 51c, respectively, to an audio amplification section 50 having two identical channels, one for the detected modulation signals from each carrier. Each channel has two output lines, 52 and 54 from one channel and 56 and 58 from the other channel. Outputs 52 and 58 are applied directly to indicator 28 and provide the proper threshold signals for initial activation of the indicator. Outputs 54 and 56 are applied through filtering and rectification sections 60 and 62, respectively, the outputs 64 and 66 from section 60 being applied to indicator 28 to provide localizer information and outputs 68 and 70 from section 62 being applied to indicator 28 to provide glide slope information. The position of the indicator mark 67 for localizer information depends upon the relative signal strength of outputs 64 and 66, while the relative position of the glide slope indicator mark 71 depends upon the relative signal strengths of outputs 68 and 70.

More specifically, the antenna 40 has a configuration suitable for receiving the carrier frequencies generated by the ILS transmitter, which are preferably both on the order of 5 GHz, as described with more particularity in following paragraphs. The antenna 40 is preferably either a rectangular horn-type antenna or a slotted wave guide. Preferably, the horn antenna has an aperture of 1 by 7 inches, and an aperture angle of approximately 45° for the carrier frequencies of the preferred embodiment. Preferably, the antenna 40 has a gain within the range of 12 to 15 db for reasons to be clarified hereafter. The antenna 40 is typically oriented vertically on the aircraft, such that the antenna aperture opens in the direction of flight, with the widemost dimension opening along a vertical axis and the narrowmost dimension opening along a transverse axis. This orientation maintains the high gain and range capability of the antenna, while still permitting the aircraft a significant amount of freedom of movement in the lateral direction. In a preferred ILS system, the antenna is configured so as to provide the desired gain at carrier frequencies of 5.10 GHz (localizer carrier frequency) and 5.23 GHz (glide slope carrier frequency).

The signals received by the antenna 40 are then applied to an RF amplifier 45 in the RF head 42, the amplifier 45 being preferably a commercially available transistor or tunnel diode amplifier having a sufficient bandwidth to amplify both carrier frequency channels at the same time. The amplified signals from the RF amplifier 45 are applied to a signal divider and separator circuit 47, which is shown with more particularity in Fig. 3.

Figure 3:
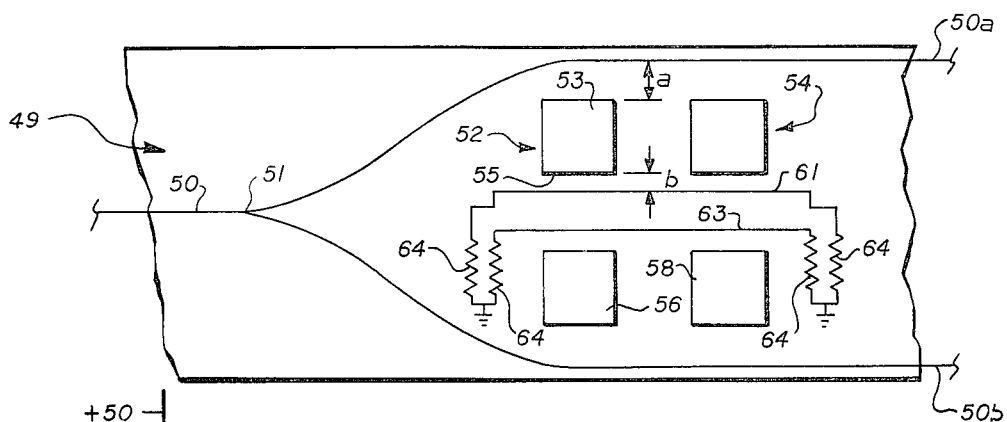
FIG. 3 is a diagram showing pictorially the divider-diplexer circuit shown in block form in FIG. 1.

Referring now to FIG. 3, the signal divider and separator circuit is preferably a strip line circuit with copper signal lines embedded in a plastic substrate 49. Copper input line 50 is split into two signal lines 50a and 50b. Preferably, but not necessarily, just after the line split at point 51 the total signal on signal line 50a has substantially the same amount of both glide slope and localizer information as exists on signal line 50b, and furthermore, the signals on the two signal lines are preferably substantially in phase. At the output end of signal lines 50a and 50b, however, one signal line will contain substantially only glide slope information, while the other line will contain substantially only localizer information, due to the filtering action of filters 52, 54, 56 and 58. Ring filters 52 and 54 are provided adjacent signal line 50a, while ring filters 56 and 58 are provided adjacent signal line 50b, the filters functioning to remove one carrier signal from signal line 50a and the other carrier signal from signal line 50b. Assuming that localizer information only is desired to be present at the output end of signal line 50a, and that glide slope information only is to be present at the output end of signal line 50b, ring filters 52 and 54 adjacent signal line 50a are physically configured so as to remove the carrier frequency in that signal line containing the glide slope information, while ring filters 56 and 58 adjacent signal line 50b are physically configured so as to remove the carrier frequency in that signal line containing the localizer information. The ring filters should be sufficiently effective that there is at least a 20 db separation between the respective modulation signal levels in each signal line i.e., at the output end of signal line 50a, the level of the glide slope signal should be 20 db down from the level of the localizer signal, and at the output end of signal line 50b, the level of the localizer signal should be 20 db down from the level of the glide slope signal.

The ring filters 52, 54, 56 and 58 are narrow strips of copper arranged preferably into outlines of squares, although circular arrangements are also practical, the distance or length of each strip around the outline being substantially equal to a wavelength of the particular carrier frequency to be reduced in the adjacent signal line 50a or 50b, with a quarter wavelength segment, e.g., segment 53 of ring filter 52, being preferably presented directly adjacent the respective signal lines 50a and 50b. The distance $a$ between the near edge (e.g., segment 53 of ring filter 52) of the ring filter and the signal lines 50a and 50b is typically on the order of 20 to 50 mils, while the distance $b$ between the filter far edge (e.g., edge 55 of filter 52) and the load lines 61 is substantially equal to or slightly less than distance $a$. The frequencies to which the ring filters are tuned are coupled into the ring filters from the signal lines 50a and 50b, and then further coupled into load lines 61 and 63, respectively, the load lines each having a resistive load 64 at opposing ends thereof to ground, so that the coupled signal energy from lines 50a and 50b is shunted to ground through the coupling action of the ring filters. After filtering, the signal remaining on line 50a is substantially only the modulated carrier frequency containing the localizer information, while the signal on line 50b is substantially only the modulated carrier containing the glide slope information.

The now-separated localizer and glide slope signals on lines 50a and 50b are then applied to impedance matching networks 70 and 72, respectively, which are typically short stubs (e.g., ¼ wavelength), appropriately placed on the transmission line and shorted at their ends to ground, which function to match the output impedance of the signal divider and separator circuit 47 (typically on the order of 50 ohms) to the input impedance of the detectors 48 and 49, which in the preferred embodiment are video detector diodes.

Identical video detector diodes 48 and 49 function to detect the signals applied to their respective inputs. The diodes must be selected with some care, due to the very high carrier frequencies (5 GHz) used in the system. Typically the diodes must have a capacitance within the range of 0.1 to 0.3 picofarads, so as to present a reasonably high impedance level at the very high frequencies involved. Furthermore, the diodes should be physically very small in size, have a relatively low noise spectrum, and must have a good tangential sensitivity, preferably at least −65 dbm. A diode commercially available which satisfies these criteria is known as a Schottky barrier diode. Other diodes meeting the above criteria may of course be used with equally good results, although the lower the tangential sensitivity, the lower the gain of the RF amplifier necessary to provide a readable output.

Load resistors 74 and 76 are connected, respectively, between the outputs of video diodes 48 and 49 and ground and are provided to supply a ground return circuit for the diodes. The value of load resistors 74 and 76 must be sufficiently greater than the input impedance of the follow-on circuitry so as to not dissipate an appreciable portion of the power from the output of the diodes 48 and 49.

The signals present at circuit points 76 and 78 (FIG. 2) at the output of the video diodes 48 and 49 are the modulation signals (90 Hz and 150 Hz) from the localizer and glide slope beams. Switches 51a, 51b and 51c, as briefly explained above, connect the RF head 42 between the antenna 40 and the audio amplification section 50. The RF head 42 may be provided on a single module, as can alternate RF heads 43 and 45 and others if desirable, with each RF head being designed or tuned to different sets of carrier frequencies.

Through use of switches 51a, 51b, and 51c, the correct RF head may be conveniently connected. As further explained in following paragraphs, the detected signals are then applied to amplification and filtering circuitry for eventual application to a visual indicator which shows the position of the aircraft relative to the desired landing path by means of localizer and glide slope indicators.

Figure 4:
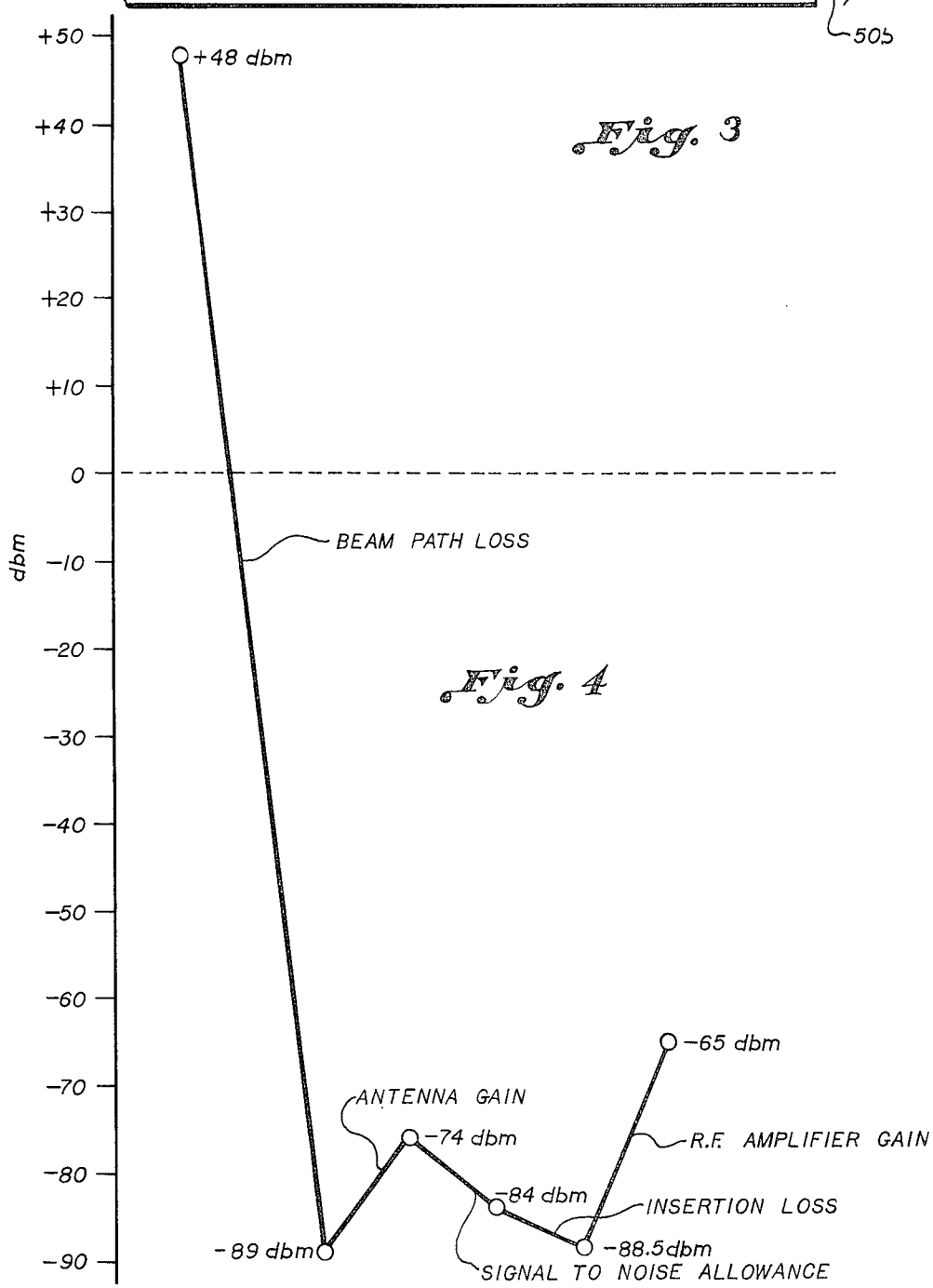
FIG. 4 is a diagram showing representative signal power levels at various points in the circuit of FIGS. 2 and 3.

Referring now to FIG. 4, the relative power levels at various circuit points up to the detector diodes 70 and 72 are shown diagrammatically. Typically, the power level of the beams as they originate from the transmitter is on the order of 63 watts, and decreases over the defined range of the ILS system to a level of −89 dbm at the receiver on an aircraft 20 miles out from the transmitter. Thus, the signal strength of the ILS beams at the antenna on the aircraft is typically 137 db down in worst case when the aircraft is at the farthest reach of the ILS system. If it is not necessary that the aircraft detect the ILS system at such an extended distance, the signal loss over the transmission path is correspondingly less.

The antenna preferably provides a gain of approximately 15 db, such that the received signals are at −74 dbm at the output of the antenna. A signal-to-noise loss on the order of 10 db is an estimated safety factor which provides a suitable signal margin for the circuit to distinguish the desired ILS signals from background noise. Additionally, a 4.5 db insertion loss for the stripline circuit 47 is typical, resulting in a signal level without amplification of −88.5 dbm at the input to video detectors 48 and 49. Since the diode sensitivity of Schottky barrier diodes is on the order of −65 dbm, an RF amplifier is required which provides a gain of at least 23.5 db. Thus, with an RF amplifier having a gain of 23.5 db, a microwave receiver is provided which does not require an IF amplifier, a mixer or a local oscillator. Furthermore, the gain requirements of the RF amplifier may be reduced by making some of the parameters of the system more practical. For instance, by requiring only a 10 mile system range, instead of 20 miles, and using a diode with an increase of sensitivity of −10 db, the gain requirements of the RF amplifier can be reduced to less than 10 db. This results in a simple and inexpensive microwave receiver for the ILS.

The outputs of the detector diodes 48 and 49 providing localizer and glide slope information, respectively, are then applied to identical amplification circuits. Each channel (glide slope and localizer) includes both a video and a "flag" amplifier. Flag amplifiers 80 and 82 operate in each channel as a threshold detector for indicator 28, as protection against spurious indication. When the signals present at the input of the flag amplifiers 80 and 82 reach a certain predetermined value, the output from the flag amplifiers is sufficient in magnitude to energize electromagnetic coils (not shown) in indicator 28 which, in turn, function to remove an obstructing "flag" from the indicator 28, thus indicating to the pilot that sufficient ILS signal strength is present for the indicator 28 to provide reliable results.

The signal energy present at circuit points 76 and 78 are also applied, respectively, to video amplifiers 84 and 86, which amplify the 90 Hz and 150 Hz signals in each channel and in turn apply the amplified signals to filter and rectifier circuits 88, 90, 92 and 94. Filter and rectifier circuits 88 and 92 are both adjusted to pass 90 Hz signals, while filter and rectifiers 90 and 94 are both adjusted to pass 150 Hz signals. The outputs of filter and rectifier circuits 88 and 90 in the localizer channel are applied, respectively, on lines 64 and 66 to standard lateral defection circuits (not shown) in the indicator 28, the position of the localizer "mark" 67 on the illuminated face of the indicator 28 being determined by the relative strength of the signals on lines 64 and 66.

In the glide slope channel, the signal output from filter and rectifier circuits 92 and 94 are applied, respectively, on lines 70 and 68 to standard vertical deflection circuits (not shown) in the indicator 28. The position of the glide slope "mark" 71 on the face of the indicator between the two vertical extremes is determined by the strength of the respective signals on lines 70 and 68.

The position of the localizer and glide slope marks provides an indication to the pilot of the position of his aircraft relative to the desired landing path. If the aircraft is on the desired landing path, the two marks will form a cross in the center of the face of the indicator.

Thus, a microwave receiver has been disclosed which utilizes a combination of elements to provide detected glide slope and localizer signals without the use of an IF amplifier and associated mixer and local oscillator. By using detector diodes having a high tangential sensitivity, and maintaining the signal losses in the receiver to a minimum, a simple, low-cost ILS microwave receiver is provided. It should be understood, however, that the circuit shown in FIGS. 2 and 3 is a preferred embodiment, and various changes in the circuit may be made without departing from the spirit of the invention. For instance, various antenna configurations or other filters may be used, in the separation network as well as different types of detector diodes and their matching networks.

What is claimed is:

1. Signal processing apparatus, for use in a microwave-frequency instrument landing system for aircraft or similar maneuverable apparatus, in which system two orthogonal pairs or modulated overlapping beams are projected into space, wherein equal modulation signal levels in the pairs of overlapping beams define a directional axis which is the desired navigational path of the aircraft, one pair of beams having a first carrier signal and so oriented in space as to provide glide slope information of the aircraft relative to the desired navigation path, and the other pair of beams having a second carrier signal and so oriented in space as to provide localizer information of the aircraft relative to the desired navigation path, each carrier signal being modulated by first and second modulating signals of different frequency, the signal processing apparatus comprising:

antenna means mounted on the aircraft for receiving said two orthogonal pairs of projected beams and providing at a common output thereof a composite signal which comprises modulated carrier signals from each of said received beams;

signal splitting means including a strip line circuit having a dielectric substrate on which an input strip line is disposed, said input line dividing into two separate, spaced apart, output strip lines also disposed on said substrate, said input line connected to said common output of said antenna means for receiving said composite signal and said output lines each conducting a separate portion of said composite signal;

a first series of filter means arranged adjacent a first of said output lines for filtering out at least a substantial portion of said first carrier signals from said portion of said composite signal conducted thereby to yield first channel signals on such first output line that are derived substantially from said second carrier signals;

a second series of filter means arranged adjacent a second of said output lines for removing said second carrier signals from said portion of said composite signal conducted thereby to yield second channel signals on such second output line that are derived substantially from said first carrier signals;

means for detecting said first and second channel signals;

first means for discriminating between modulating frequencies of said detected first channel signals and applying the discriminated signals to a glide slope indicator, any difference in magnitude between said discriminated signals of said detected first channel signals being indicative of a glide slope offset from the desired navigation path; and, second means for discriminating between modulating frequencies of said detected second channel signals and applying the discriminated signals to a localizer indicator, any difference in magnitude between said discriminated signals of said detected second channel signals being indicative of a localizer offset from the desired navigation path.

2. The apparatus of claim 1, including a load line associated with each series of filters and spaced adjacent therefrom, and further including a ground circuit, to which each of said load lines is terminated.

3. The apparatus of claim 2, wherein each series of filters is spaced away from their associated strip lines slightly less than from their associated load lines.

4. The apparatus of claim 1, wherein said detecting means are video detector diodes having a tangential sensitivity of at least −65 dbm.

5. The apparatus of claim 1, wherein said detecting means are video detector diodes each having an output connection, and including resistance means connected from the output connection of each detector diode to ground.

6. The apparatus of claim 1, wherein said detecting means are video detector diodes and including matching circuit means connecting each of said strip lines to one of said detector diodes.

7. The apparatus of claim 6, wherein said matching circuit means are transmission line stubs.

8. The apparatus of claim 1, wherein said splitting means, said eliminating means and said detecting means comprise a circuit unit adapted to accommodate first and second carrier frequencies, and wherein said signal processing apparatus further includes a plurality of circuit units each adapted to accommodate other predetermined carrier frequencies, and means for selectively coupling one of said circuit units between said antenna means and said first and second discriminating means.

9. Signal processing apparatus for use in a microwave-frequency instrument guidance system for an aircraft or similar maneuverable apparatus, in which system two orthogonal pairs of modulated overlapping beams are projected into space so that equal modulation signal levels in the pairs of overlapping beams define a directional axis that is the desired navigational path of the aircraft, one pair of beams having a first microwave carrier signal and so oriented in space as to provide glide slope information of the aircraft relative to the desired navigation path, and the other pair of beams having a second microwave carrier signal and so oriented in space as to provide localizer information of the aircraft relative to the desired navigation path, each carrier signal being modulated by first and second modulating signals of different frequencies, respectively, the signal processing apparatus comprising:

antenna means adapted for mounting on the aircraft for receiving said two orthogonal pairs of projected beams and for providing at a common output thereof a composite microwave signal which comprises said first and second modulated microwave carrier signals;

microwave signal splitting means having a microwave input line connected to said common output, said input line dividing into first and second microwave output lines each conducting a separate portion of said composite microwave signal;

first filter means associated with said first microwave output line for eliminating therefrom at least a substantial portion of said first carrier signal, whereby the remaining second carrier signal is issued at an output of said first microwave line;

second filter means associated with said second microwave output line for eliminating therefrom at least a substantial portion of said second carrier signal, whereby the remaining first carrier signal is issued at an output of said second line;

first detector means connected to said first output line to receive the second carrier signal for detecting said first and second modulating signals thereon;

second detector means connected to said second output line to receive the first carrier signal for detecting said first and second modulating signals thereon;

first signal discriminating means connected to said first detector means for discriminating between said first and second modulating signals detected on said second carrier signal and applying such discriminated signals to a guide slope indicator;

second signal discriminating means connected to said second detector means for discriminating between said first and second modulating signals detected on said first carrier signal and applying such discriminated signals to a localizer indicator.

* * * * *